Nov. 7, 1939.　　　H. A. MacKNIGHT　　　2,178,892
TENTER CLIP
Filed April 26, 1938
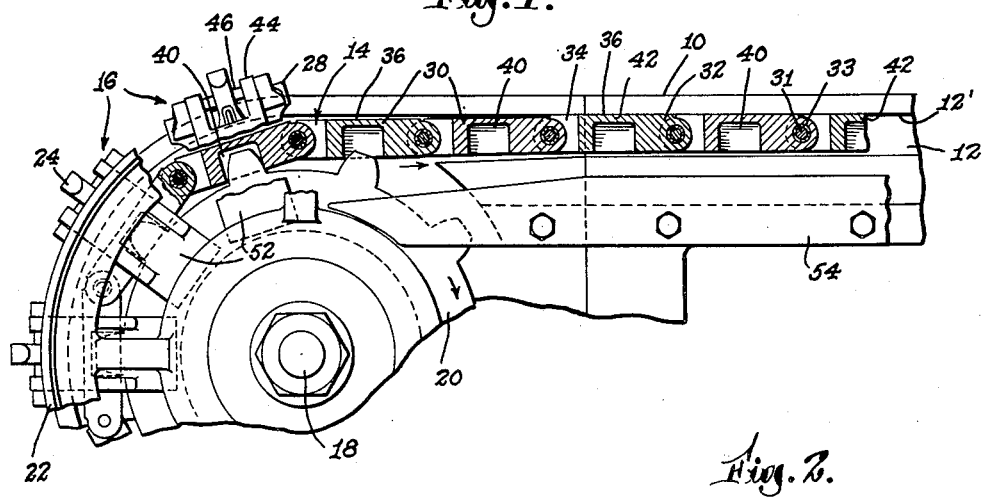
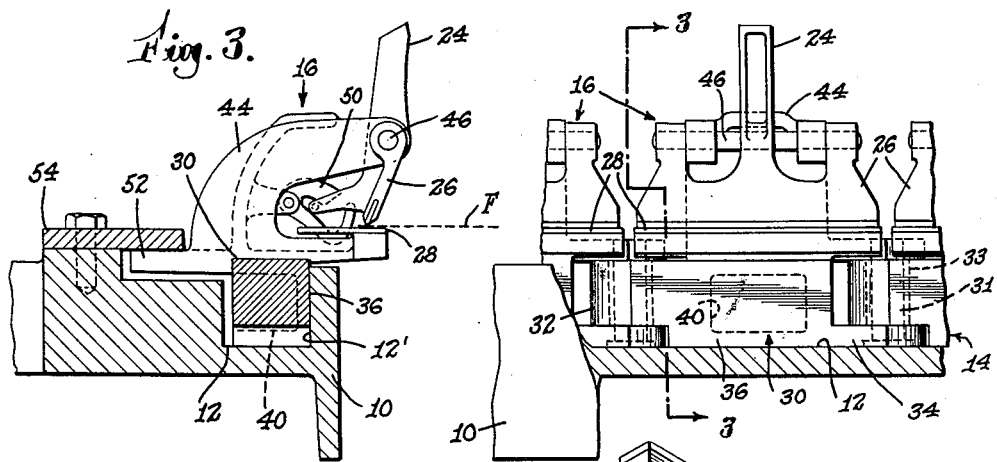
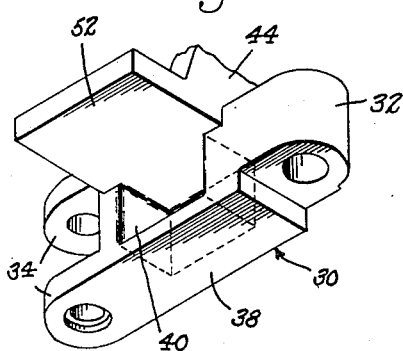
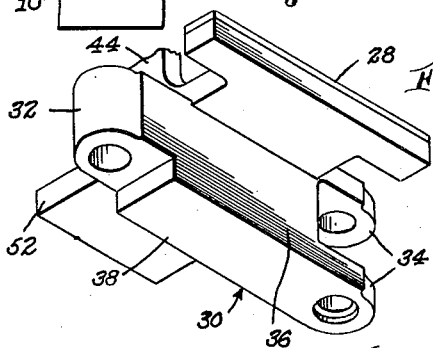
Inventor
HARRY A. MACKNIGHT
by Harry Dexter Peck
Attorney Patented Nov. 7, 1939

2,178,892

UNITED STATES PATENT OFFICE 2,178,892

TENTER CLIP

Harry A. MacKnight, Cranston, R. I., assignor to Winsor & Jerauld Manufacturing Company, Providence, R. I., a corporation of Maine Application April 26, 1938, Serial No. 204,316

1 Claim. (Cl. 26—61)

This invention relates to tentering machines and more particularly to the tenter clips which make up the tenter chain of a tentering machine.

One of the objects of this invention is to provide a tenter clip so constructed as to prevent the oil from the tenter chain drive sprockets from spreading to and damaging the cloth being tentered and at the same time to allow lubrication between the chain and its driving sprocket.

Another object of this invention is to provide a tenter clip with a better forward bearing surface of greater area than is the usual practice thereby increasing the life of the tentering chain and guides.

Other objects of this invention will be made more apparent from the accompanying drawing and description but these are to be taken as merely illustrative for it is intended that the patent shall cover by suitable expression in the appended claim whatever features of patentable novelty exist in the invention disclosed.

In the accompanying drawing:

Figure 1 is a plan view of a portion of a tentering machine partly broken away and in section showing the improved clips united in a chain and arranged to be driven by a sprocket;

Figure 2 is an elevation of a portion of the rail of a tentering machine with several clips thereon;

Figure 3 is a cross-section on the line 3—3 of Figure 2;

Figure 4 is a partial perspective of the rear of my novel clip; and

Figure 5 is a partial perspective of the front of my clip.

In the drawing, 10 indicates the usual chain rail of a tentering machine having the usual channel 12 for guiding the tenter chain 14 therein. This tenter chain 14 is composed of links or tenter clips 16. The channel 12 extends semi-circularly around that portion of the rail 10 that surrounds the drive shaft 18 so that a drive sprocket 20 will engage the chain 14 in such a manner as to drive said chain in the direction indicated by the arrow. A circular flange 22 operates in the usual manner to engage the upper extensions 24 of the pivoted operating jaws 26, so as to open said jaws and allow fabric F to enter the space between the jaw 26 and the clip plate 28.

My novel tenter clip 16 is formed of a body portion 30, a male end 32, and a female end 34, all three portions lying in approximately a straight line longitudinally of the chain. Pins 31 and bushings 33 connect the opposite ends of adjacent clips 16 to form a tenter chain. A front bearing face 36 extends along the front of the body 30 and part of the male end 32. A bottom bearing surface 38 extends along the bottom of the body 30 and along a portion of the female end 34. The front bearing surface 36 when under the tension imparted by a fabric F engaged by the jaw 26 and clip plate 28 bears with considerable pressure against the side surface 12' of the channel 12. In the face of the body 30 opposite the front bearing surface 36 is a recess 40 of sufficient depth and width to accommodate the teeth of the drive sprocket 20 in such a manner as to allow the teeth to actuate the body 30.

In the usual construction of tenter clips the recess that engages the teeth of the driving sprocket extends completely through the body portion and permits oil that is used for the proper lubrication of the sprocket to travel through the clip and thence spread on to that portion of the clip contacting the fabric and causing damage to same. By terminating this recess in a solid wall 42 I not only prevent the oil from spreading but I also prevent a continuous unbroken front bearing surface 36 to bear against the surface 12' of the channel 12 when the clip is under the tension applied by the fabric. By eliminating the opening through the body portion 30 I am enabled to increase the effective bearing area approximately one-third, hence the resultant pressure per unit of area is considerably less with my clip. The wear from friction between the surface 12' and my clip is thereby reduced and longer life is obtained in these parts.

The upper or cloth gripping portions of my novel clip may be made in any of the common forms without departing from the subject of my invention. The form I have illustrated in the drawing consists of an arch portion 44 carrying a pin 46 on which is pivoted the operating jaw 26. A control link 50 prevents the jaws from gripping the fabric until only the proper amount of selvage is retained in the tenter clip. A tail piece 52 integral with the body 30 bears against the plate 54 mounted on the rail 10.

It will be realized that I have described and shown a practical and operative construction, nevertheless changes may be made in the size, shape and disposition of parts without departing from the spirit of my invention.

I claim:

A tenter clip for a tenter chain movable along a horizontal rail and around a sprocket rotatable about a vertical axis, said clip comprising a body portion with integral arms at one end and an integral tongue at the opposite end whereby the clip may be directly connected to like adjacent clips; a continuous uninterrupted integral bearing surface on one vertical side of said body portion extending from said arms to said tongue for sliding engagement with the vertical side face of said rail; a recess in said body portion behind said bearing surface, with its single opening in the vertical side of said body portion opposite said bearing surface, for receiving a tooth of said sprocket; and means for engaging a strip of cloth moving in a direction parallel to the horizontal rail.

HARRY A. MacKNIGHT.